(12) United States Patent
Sarkis et al.

(10) Patent No.: US 11,026,257 B2
(45) Date of Patent: Jun. 1, 2021

(54) PDCCH WITH REPETITION

(71) Applicant: QUALCOMM Incorporated, San Diego, CA (US)

(72) Inventors: Gabi Sarkis, San Diego, CA (US); Chih-Ping Li, San Diego, CA (US); Alexandros Manolakos, San Diego, CA (US); Wanshi Chen, San Diego, CA (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 40 days.

(21) Appl. No.: 16/455,431

(22) Filed: Jun. 27, 2019

(65) Prior Publication Data
US 2020/0008235 A1    Jan. 2, 2020

(30) Foreign Application Priority Data
Jun. 29, 2018   (GR) .............................. 20180100290

(51) Int. Cl.
*H04W 72/14* (2009.01)
*H04W 72/04* (2009.01)
(Continued)

(52) U.S. Cl.
CPC ........... *H04W 72/14* (2013.01); *H04L 1/1858* (2013.01); *H04L 1/203* (2013.01); *H04L 5/0032* (2013.01);
(Continued)

(58) Field of Classification Search
CPC combination set(s) only.
See application file for complete search history.

(56) References Cited

U.S. PATENT DOCUMENTS

2014/0133395 A1* 5/2014 Nam ..................... H04L 5/0023
                                                          370/328
2017/0289953 A1* 10/2017 Chae .......................... G01S 1/02
(Continued)

OTHER PUBLICATIONS

LG Electronics: "Details on M-PDCCH Search Space Design", 3GPP TSG RAN WG1 Meeting #82bis, 3GPP Draft; R1-155363 Details on M-PDCCH Search Space Design, 3rd Generation Partnership Project (3GPP), Mobile Competence Centre, 650, Route Des Lucioles ; F-06921 Sophia-Antipolis Cedex, France, vol. RAN WG1, No. Malmo, Sweden; Oct. 5, 2015-Oct. 9, 2015, Oct. 4, 2015 (Oct. 4, 2015), pp. 1-5, XP051002273, Retrieved from the Internet: URL: http://www.3gpp.org/ftp/Meetings_3GPP_SYNC/RAN1/Docs/ [retrieved on Oct. 4, 2015], Section 4.

(Continued)

*Primary Examiner* — Yee F Lam
(74) *Attorney, Agent, or Firm* — Patterson & Sheridan L.L.P.

(57) ABSTRACT

Certain aspects of the present disclosure provide techniques for physical downlink control channel (PDCCH) with repetitions, including techniques for signaling the number of PDCCH repetitions, the hybrid automatic repeat request (HARQ) timeline processing with PDCCH repetitions, and the demodulation reference signal (DMRS) structure for the repeated PDCCH. A method for wireless communications, by a user equipment (UE), includes determining a number of repetitions of a PDCCH. Each of the PDCCH repetitions has a same downlink control information (DCI) payload, a same aggregation level, and/or a grant for a same data channel allocation. The method includes monitoring for the PDCCH based on the determined number of repetitions.

28 Claims, 14 Drawing Sheets

(51) Int. Cl.
*H04L 5/00* (2006.01)
*H04L 1/20* (2006.01)
*H04L 1/18* (2006.01)

(52) U.S. Cl.
CPC .......... *H04L 5/0051* (2013.01); *H04L 5/0057* (2013.01); *H04W 72/042* (2013.01); *H04W 72/0413* (2013.01)

(56) References Cited

U.S. PATENT DOCUMENTS

| | | | |
|---|---|---|---|
| 2018/0020378 A1 | 1/2018 | Tsuboi et al. | |
| 2018/0343653 A1* | 11/2018 | Guo | H04L 5/0053 |
| 2019/0069285 A1* | 2/2019 | Chandrasekhar | H04B 7/0695 |
| 2019/0149365 A1* | 5/2019 | Chatterjee | H04L 5/0092 370/329 |
| 2019/0174466 A1* | 6/2019 | Zhang | H04L 5/005 |
| 2019/0182807 A1* | 6/2019 | Panteleev | H04L 1/1819 |
| 2019/0222400 A1* | 7/2019 | Bagheri | H04L 1/0068 |
| 2019/0246395 A1* | 8/2019 | Huang | H04L 5/0003 |
| 2019/0306842 A1* | 10/2019 | Cirik | H04B 7/0617 |
| 2019/0342874 A1* | 11/2019 | Davydov | H04L 5/0094 |
| 2019/0349061 A1* | 11/2019 | Cirik | H04W 80/02 |
| 2019/0357185 A1* | 11/2019 | Kwak | H04L 5/0053 |
| 2020/0021419 A1* | 1/2020 | Taherzadeh Boroujeni | H04L 5/0091 |
| 2020/0052846 A1* | 2/2020 | Takeda | H04L 5/0048 |
| 2020/0213069 A1* | 7/2020 | Jiang | H04L 5/0053 |
| 2020/0221428 A1* | 7/2020 | Moon | H04L 5/00 |

OTHER PUBLICATIONS

Nokia et al., "Discussion on Reliability Enhancement for PDCCH", 3GPP TSG RAN WG1 Meeting #92bis, 3GPP Draft; R1-1804617 URLLC_CONTROL_RELIABILITY, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051426886, Retrieved from the Internet: URL: http://www.3gpp.org/ftp/Meetings_3GPP_SYNC/RAN1/Docs/ [retrieved on Apr. 15, 2018], Section 1-2.

Partial International Search Report—PCT/US2019/039840—ISA/EPO—dated Sep. 11, 2019.

Spreadtrum Communications: "Discussion on PDCCH Repetition for URLLC", 3GPP TSG RAN WG1 Meeting #92, 3GPP Draft; R1-1801840 Discussion on PDCCH Repetition for URLLC, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 15, 2018, pp. 1-2, XP051396891, Retrieved from the Internet: URL: https://www.3gpp.org/ftp/tsg_ran/WG1_RL1/TSGR1_92/Docs/[retrieved on Feb. 15, 2018], Section 2.

Xiaomi: "Discussion on the PDCCH Repetition for NR URLLC", 3GPP TSG RAN WG1 Meeting #92bis, 3GPP Draft; R1-1804944_Discussion on the PDCCH Repetition for NR URLLC, 3rd Generation Partnership Project (3GPP), Mobile Competence Centre; 650, Route Des Lucioles; F-06921 Sophia-Antipolis Cedex; France, vol. Ran WG1, No. Sanya, China; Apr. 16, 2018-Apr. 20, 2018, Apr. 15, 2018 (Apr. 15, 2018), 5 Pages, XP051427207, Retrieved from the Internet: URL: http://www.3gpp.org/ftp/Meetings_3GPP_SYNC/RAN1/Docs/ [retrieved on Apr. 15, 2018], Section 2.

International Search Report and Written Opinion—PCT/US2019/039840—ISA/EPO—dated Nov. 13, 2019.

* cited by examiner

PDCCH WITH REPETITION

CROSS-REFERENCE TO RELATED APPLICATION(S)

This application claims benefit of and priority to Greek Patent Application No. 2018/0100290, filed Jun. 29, 2018, herein incorporated by reference in its entirety as if fully set forth below and for all applicable purposes.

BACKGROUND

Field of the Disclosure

Aspects of the present disclosure relate to wireless communications, and more particularly, to techniques for physical downlink control channel (PDCCH) with repetitions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure are related to techniques for physical downlink control channel (PDCCH) with repetitions, including techniques for signaling the number of PDCCH repetitions, the hybrid automatic repeat request (HARQ) timeline processing with PDCCH repetitions, and the demodulation reference signal (DMRS) structure for the repeated PDCCH.

Certain aspects provide a method for wireless communication by a user equipment (UE). The method generally includes determining a number of repetitions of a PDCCH. Each of the PDCCH repetitions has a same downlink control information (DCI) payload, a same aggregation level, and/or a grant for a same data channel allocation. The method includes monitoring for the PDCCH based on the determined number of repetitions.

Certain aspects provide an apparatus for wireless communication. The apparatus generally includes means for determining a number of repetitions of a PDCCH. Each of the PDCCH repetitions has a same DCI payload, a same aggregation level, and/or a grant for a same data channel allocation. The apparatus includes means for monitoring for the PDCCH based on the determined number of repetitions.

Certain aspects provide an apparatus for wireless communication. The apparatus generally includes a memory and at least one processor coupled with the memory and configured to determine a number of repetitions of a PDCCH. Each of the PDCCH repetitions has a same DCI payload, a same aggregation level, and/or a grant for a same data channel allocation. The at least one processor is configured to monitor for the PDCCH based on the determined number of repetitions.

Certain aspects provide a computer readable medium having computer executable code stored thereon. The computer readable medium generally includes code for determining a number of repetitions of a PDCCH. Each of the PDCCH repetitions has a same DCI payload, a same aggregation level, and/or a grant for a same data channel allocation. The computer readable medium generally includes code monitoring for the PDCCH based on the determined number of repetitions.

Certain aspects provide methods, apparatus, processors, and computer readable media for corresponding operations by a base station to those performed by the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

In certain systems, such as 5G NR systems, the base station (BS) transmits the physical downlink control channel (PDCCH) with repetitions to schedule a user equipment (UE) for a physical downlink shared channel (PDSCH) or physical uplink shared channel (PUSCH).

Aspects of the present disclosure provide apparatus, methods, processing systems, and computer readable mediums for determining the number of PDCCH repetitions, monitoring/transmitting the PDCCH based on determined number of repetitions, the hybrid automatic repeat request (HARQ) processing timeline with repeated PDCCH, and demodulation reference signal (DMRS) structure for repeated PDCCH.

The following description provides examples for PDCCH with repetitions, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Figure 1:
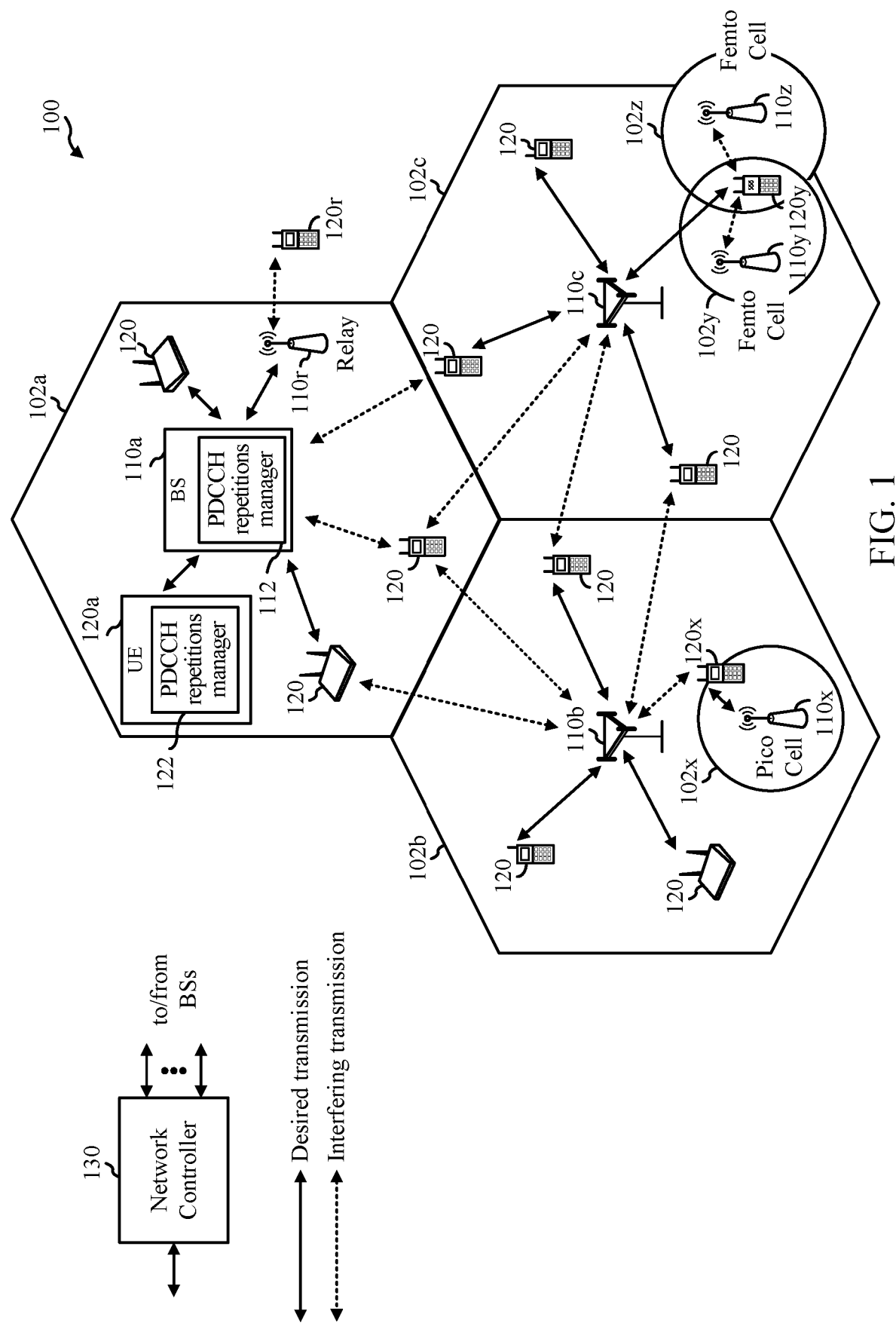
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be a New Radio (NR) or 5G network.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

As shown in FIG. 1, the UE 120a includes a PDCCH repetition manager 122. The PDCCH repetition manager 122 may be configured to determine a number of PDCCH repetitions scheduling the UE 120a for a PDSCH transmission and/or a PUSCH transmission, in accordance with aspects of the present disclosure. Each PDCCH repetition may have a same downlink control information (DCI) payload, a same aggregation level, and/or a grant for a same data channel allocation. The PDCCH repetition manager 112 may be configured to monitor PDCCH repetitions based on the determination, in accordance with aspects of the present disclosure. As shown in FIG. 1, the BS 110a has a PDCCH repetition manager 112. The PDCCH repetition manager 112 may be configured to configure the UE 120a semi-statically with the number of repetitions, signal the number of repetitions to the UE 120a, or implicitly signal or configure the number of PDCCH repetitions. The BS 110 may schedule the UE 120a for the PDSCH and hybrid automatic repeat request (HARQ) acknowledgment (ACK) resources for the PDSCH scheduled by the PDCCH repetitions. The BS 110a may transmit demodulation reference signals (DMRS) based on the PDCCH repetitions.

Wireless communication network 100 may also include relay stations (e.g., relay station 110r), also referred to as relays or the link, that receive a transmission of data and/or other information from an upstream station (e.g., BS 110a or UE 120r) and sends a transmission of the data and/or other information to a downstream station (e.g., UE 120 or BS 110), or that relays transmissions between UEs 120, to facilitate communication between devices.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

As mentioned above, aspects of the present disclosure relate to PDCCH with repetitions.

A PDCCH may be transmitted in a control resource set (CORESET). The CORESET is a set of resources configures for PDCCH transmission. Resource elements corresponding to the same orthogonal frequency division multiplexing (OFDM) symbol may be grouped into resource element groups (REGs). Each REG may include one physical resource block (PRB) (e.g., 12 subcarriers). A number of REGs may be grouped or mapped to a number of control channel elements (CCEs). Each CCE may be represented logically by an index number. In some examples, six REGs may be mapped to one CCE.

Figure 2:
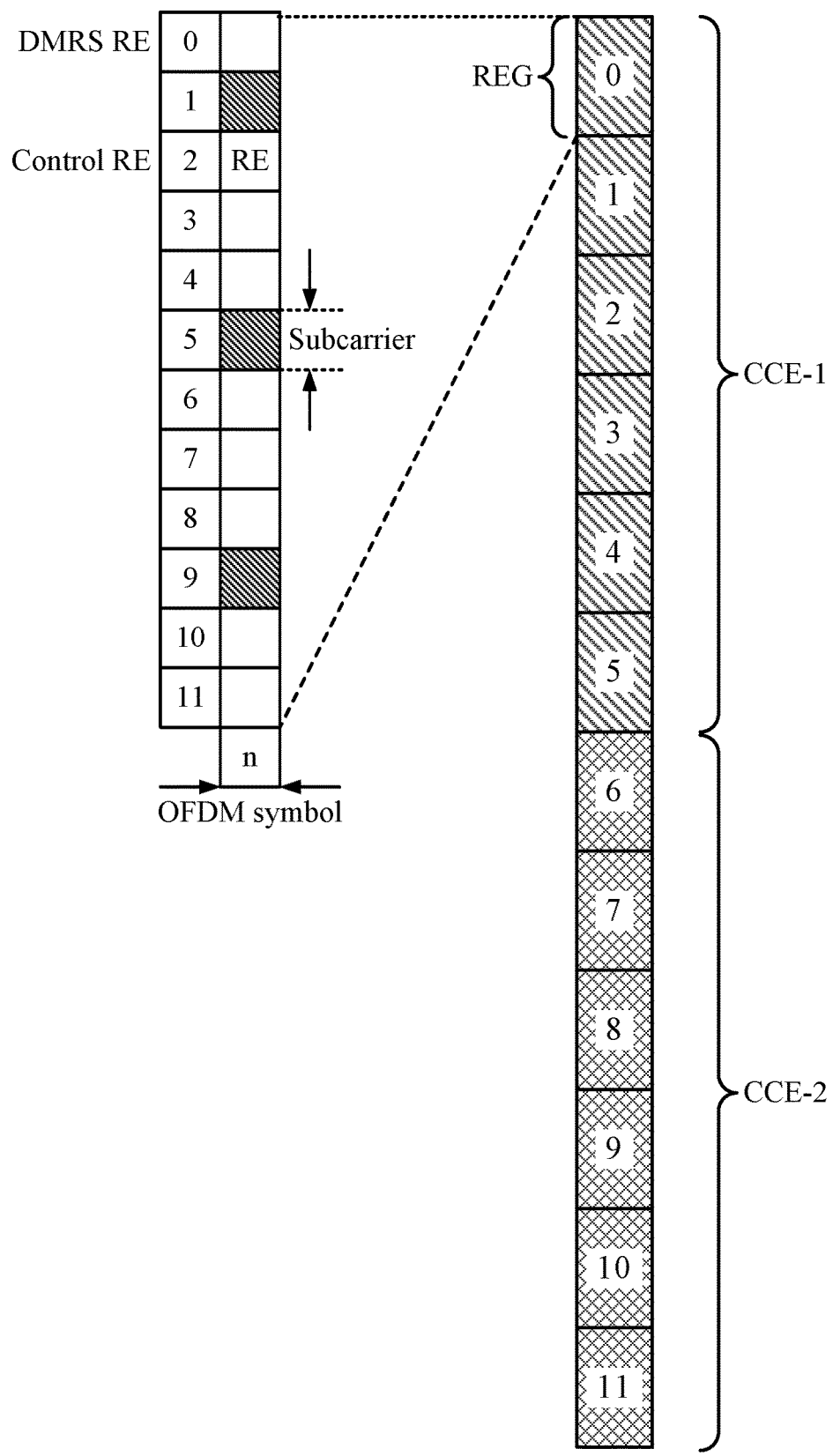
FIG. 2 shows an example 1-symbol control resource set (CORESET) for an aggregation level 1 PDCCH, in accordance with certain aspects of the present disclosure.
Figure 3:
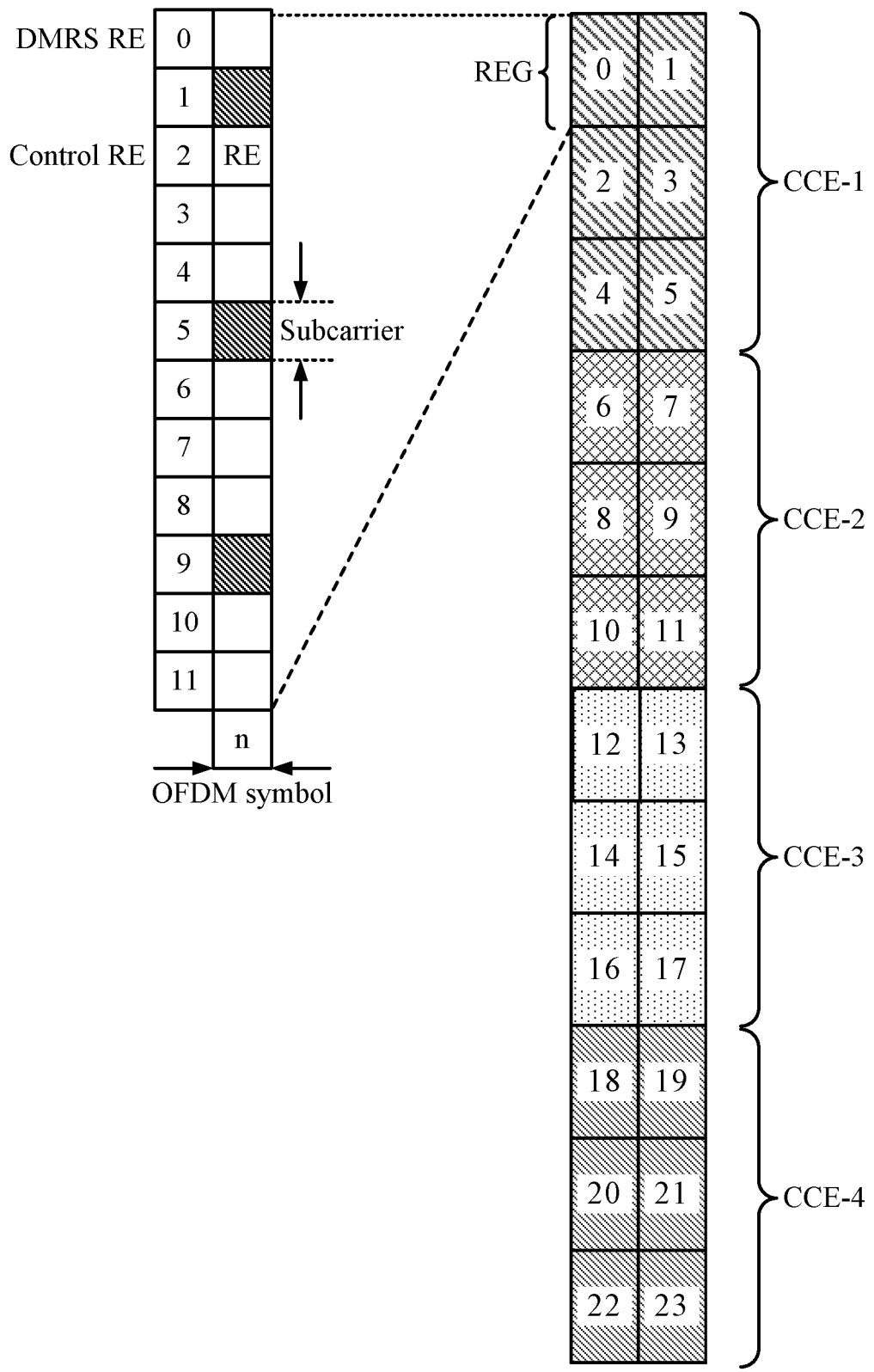
FIG. 3 shows an example 2-symbol CORESET for an aggregation level 4 PDCCH, in accordance with certain aspects of the present disclosure.

The number of CCEs available for carrying the PDCCH may be variable depending on the number of OFDM symbols used, the bandwidth of the system, and/or a number of antenna ports present at the scheduling entity. In some examples, consecutive CCEs may be mapped into REGs that are distributed (i.e., non-consecutive) in frequency. Consecutive CCEs may refer to CCEs that are consecutive in their numbering or ordering in the logical space. Two REGs are not consecutive when they are not adjacent to each other (i.e., separated by one or more REs). This is called distributed CCE-to-REG mapping. In some examples, consecutive CCEs are mapped to REGs that are consecutive in frequency. This is called localized CCE-to-REG mapping. For example, consecutive or adjacent REGs are not separated from each other by one or more REs An aggregation level (AL) of a PDCCH transmission refers to the number of CCEs utilized for the PDCCH transmission. In some examples, the PDCCH may be transmitted using AL1, AL2, AL4, and/or AL8. For AL1, one CCE may be used to carry the PDCCH transmission. For AL2, two CCEs may be used to carry the PDCCH transmission. For AL4, four CCEs may be used to carry the PDCCH transmission. For AL8, eight CCEs may be used to carry the PDCCH transmission. Therefore, a higher AL can accommodate a bigger payload (e.g., more bits) in the PDCCH transmission than a lower AL. A PDCCH may include any number of CCEs based on different ALs. PDCCH may carry downlink control information (DCI) and/or other control messages. FIG. 2 shows an example 1-symbol CORESET for an AL 1 PDCCH, and. FIG. 3 shows an example 2-symbol CORESET for an AL 4 PDCCH. In the example shown in FIG. 2 and FIG. 3, the PDCCH is transmitted with a demodulation reference signal (DMRS) pattern and all REGs may have the same DMRS density.

A search space refers to the resources in a slot assigned or allocated to a UE for finding its PDCCH. Within each CORESET, one or more search spaces (e.g., common search space (CSS), UE-specific search space (USS), etc.) may be defined for a given UE. One or more CCEs may be assigned to the search space of one or more UEs or scheduled entities, and the UE can find its PDCCH in the assigned CCEs. The search space is defined by the AL, the number of PDCCH candidates, and the PDCCH monitoring occasion. That is, the search space includes a set of CCEs from which the UE may find its PDCCH. The CSS may carry the common DCI that is broadcasted to all UEs or a group of UEs, for example, for scheduling remaining minimum system information (RMSI), other system information (OSI), and paging. The USS may carry the DCI for a specific UE, such as radio network temporary identifier (RNTI). Each UE may monitor a predetermined search space in a PDCCH region of a downlink slot. A search space set corresponds to a set of ALs and the corresponding number of PDCCH candidates and PDCCH occasion that is associated, by radio resource control (RRC) signaling, with one CORESET.

Thus a BS, such as a next generation Node B (gNB), may transmit PDCCH to a UE by transmitting the PDCCH in a set of CCEs that is defined as a decoding candidate within a search space for the UE, and the UE may receive the PDCCH by searching in search spaces for the UE and decoding the PDCCH transmitted by the BS. When the UE detects a control channel in the CORESET, the UE attempts to decode the control channel and communicates with the transmitting BS (e.g., the transmitting cell) according to the control data in the control channel.

The CORESETs may be configured and reconfigured by using a radio resource control (RRC) configuration or other semi-static procedure. Exemplary search space CORESET configurations in the Tables 13-1 and/or Table 13-2 from "Physical layer procedures for control" TS 38.213, Release 15, which is available from the 3GPP web site.

REG bundling may be supported per CCE. For a REG bundle, the UE can assume the same precoder is used for each of the REGs, and that the REGs in the bundle are contiguous in frequency and/or time. The precoder frequency domain granularity may be configurable as: equal to the REG bundle size in the frequency domain; or equal to the number of contiguous RBs in the frequency domain within the CORESET. A one-port transmit diversity scheme may be used per CCE with REG bundling. Quasi-colocation (QCL) information may be given per CORESET.

In certain systems, such as 5G NR systems, the BS (e.g., a gNB) transmits the PDCCH with repetitions to schedule a UE for a PDSCH or PUSCH. PDCCH repetition may improve the reliability of the PDCCH (e.g., to achieve reliability requirements for certain services, such as ultra-reliable low-latency communication (URLLC) service). The PDCCH may be repeated in the time, frequency, and/or spatial domain. The PDCCH repetitions can include the same DCI content and have the same AL (e.g., the DCIs may have the same code bits) to enable soft combining. The PDCCH repetitions can have the same DCI content, but different AL. The PDCCH repetitions can have DCI pointing to the same PDSCH or PUSCH allocation. The DCI may have different fields or different values of the same fields, for diversity gain. In some examples, repetition in time can be terminated before all repetitions are transmitted, for example, if the BS receives an acknowledgement (ACK) for the PUSCH transmission scheduled by the PDCCH.

PDCCH with repetition can affect the UE processing timeline. For example, longer PDCCH decoding time, due to the repetitions, reduces available PDSCH decoding time and reduces available PUSCH preparation time.

Example PDCCH with Repetition

Aspects of the present disclosure provide apparatus, methods, processing systems, and computer readable mediums for physical downlink control channel (PDCCH) with repetition. Certain aspects provide for determining the number of PDCCH repetitions, monitoring (e.g., at a user equipment (UE)) and transmitting (e.g., at a base station (BS)) the PDCCH based on determined number of repetitions. Certain aspects provide for the hybrid automatic repeat request (HARQ) processing timeline with repeated PDCCH. Certain aspects provide demodulation reference signal (DMRS) structure for repeated PDCCH.

Figure 4:
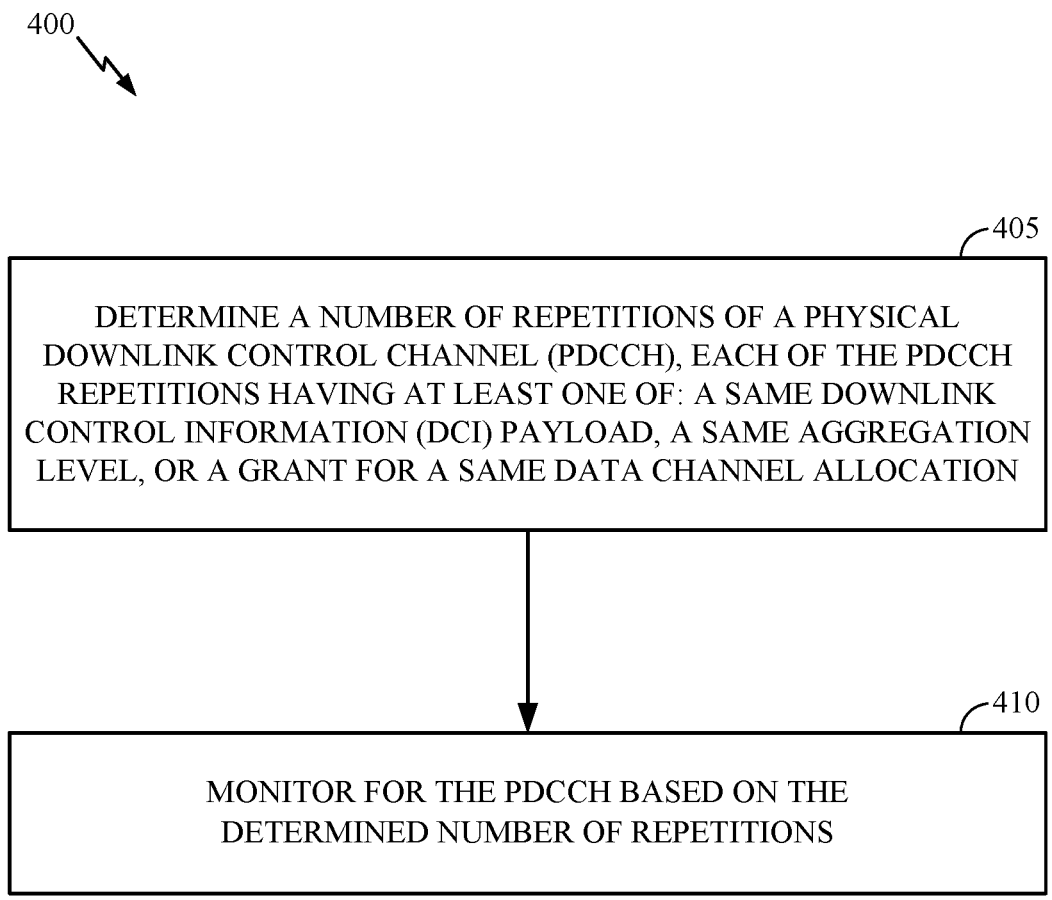
FIG. 4 is a flow chart illustrating example operations by a UE for wireless communications, in accordance with certain aspects of the present disclosure.

FIG. 4 is a flow chart illustrating example operations 400 that may be performed, for example, by a UE (e.g., such as the UE 120a in the wireless communication network 100) for wireless communications, in accordance with certain aspects of the present disclosure. Operations 400 may be implemented as software components that are executed and run on one or more processors (e.g., controller/processor 1480 of FIG. 14). Further, the transmission and reception of signals by the UE in operations 400 may be enabled, for example, by one or more antennas (e.g., antennas 1452 of FIG. 14). In certain aspects, the transmission and/or reception of signals by the UE may be implemented via a bus interface of one or more processors (e.g., controller/processor 1480) obtaining and/or outputting signals.

At 405, the UE determines a number of repetitions of a PDCCH. The PDCCH may be repeated in the time domain, the frequency domain, and/or the spatial domain. Each of the PDCCH repetitions may have a same DCI payload, a same AL, and/or a grant for a same data channel (e.g., PDSCH or PUSCH) allocation. The DCI may have different fields or different values of the same fields.

At 410, the UE monitors for the PDCCH based on the determined number of repetitions. In some examples, the UE monitors each of the PDCCH repetitions in a control resource set (CORESET).

Figure 5:
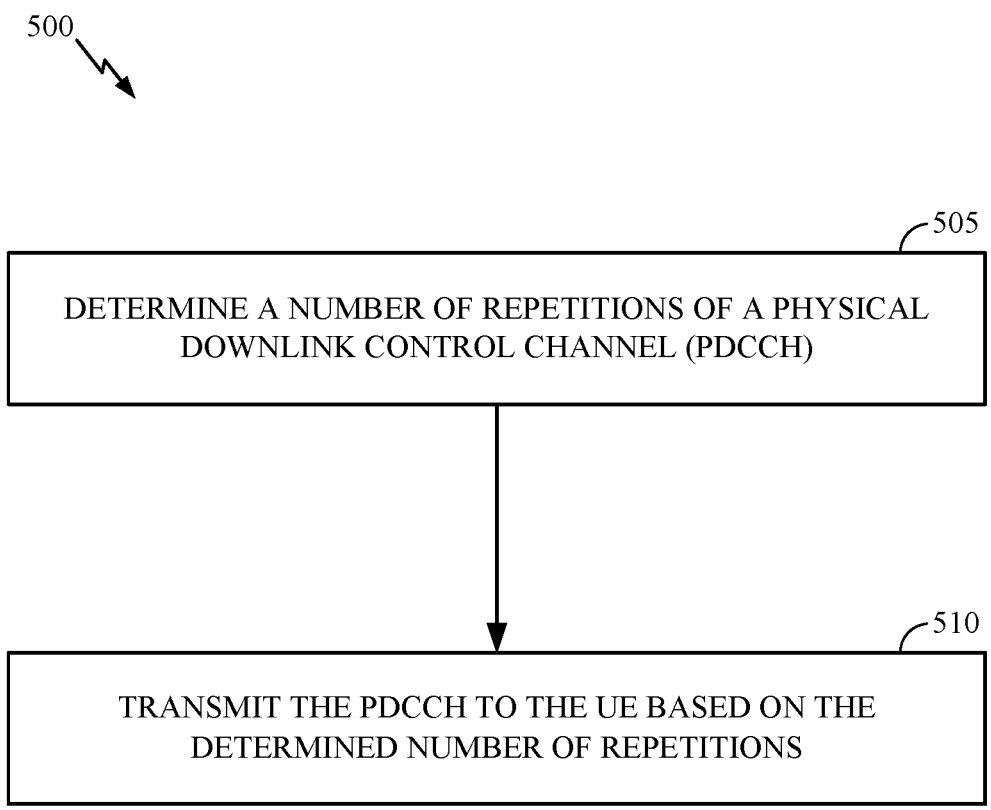
FIG. 5 is a flow chart illustrating example operations by a BS for wireless communications, in accordance with certain aspects of the present disclosure.

FIG. 5 is a flow chart illustrating example operations 500 that may be performed, for example, by a BS (e.g., the BS 110a in the wireless communication network 100) for wireless communications, in accordance with certain aspects of the present disclosure. The operations 500 may be complementary operations by the BS to the operations 400 by the UE. Operations 500 may be implemented as software components that are executed and run on one or more processors (e.g., controller/processor 1440 of FIG. 14). Further, the transmission and reception of signals by the BS in operations 1400 may be enabled, for example, by one or more antennas (e.g., antennas 1434 of FIG. 14). In certain aspects, the transmission and/or reception of signals by the BS may be implemented via a bus interface of one or more processors (e.g., controller/processor 1440) obtaining and/or outputting signals.

At 505, the BS determines a number of repetitions of a PDCCH to a UE. At 510, the BS transmits the PDCCH to the UE based on the determined number of repetitions.

In some examples, the number of repetitions may be tied to the CORESET. For example, if the PDCCH DCI is monitored in a CORESET x, then there are y PDCCH repetitions. The number of repetitions associated with the CORESET can be RRC configured, signaled in a medium access control (MAC) control element (CE), and/or signaled in DCI. The UE may receive an indication of (or be configured with) the number of repetitions associated with each of the CORESETs. Thus, the UE can determine the number of repetitions based on the number of repetitions associated with the CORESET monitored for the PDCCH.

In some examples, the number of repetitions may be tied to the search space. For example, there may be no repetition in common search space (CSS), but y repetitions in UE-specific search space (UESS). The number of repetitions associated with each search space can be RRC configured, signaled in a MAC CE, and/or signaled in DCI. Thus, the UE may determine the number of repetitions based on a search space monitored for the PDCCH.

In some examples, the number of repetitions may be tied to a scrambling (e.g., scrambling code or scrambling sequence) used for a signal. For example, the scrambling used for a DMRS or coded PDCCH bits may indicate the number of repetitions. The number of repetitions associated with different scramblings can be RRC configured, signaled in a MAC CE, and/or signaled in DCI. Thus, the UE may determine the number of repetitions based on the scrambling of a DMRS or PDCCH.

In some examples, the number of repetitions is indicated via a global RRC parameter.

In some examples, the number of repetitions may be tied to channel state information (CSI) reporting. For example, if the UE is configured to report a channel quality indicator (CQI) associated with a particular block error rate (BLER) target, y repetitions may be used.

Thus, the UE may determine the number of repetitions based on CSI reporting. The UE may determine a first number of repetitions if (e.g., when) the target BLER is equal to or greater than a threshold (e.g., $1 \times 10^{-5}$, $1 \times 10^{-6}$, or some other threshold value) and a second number of repetitions if (e.g., when) the target BLER is below the threshold. In some examples, the number of repetitions is used (and determined/assumed by the UE), only one the CSI report with the target BLER is triggered. In some examples, the y repetitions is based on the reported CQI value. For example, if reported CQI less than the threshold BLER target the y repetitions is used (and determined/assumed by the UE), and if the reported CQI is equal to or above the threshold, a different number of repetitions is used. Thus, the UE may determine a first number of repetitions if a CQI equal to or greater than a threshold is reported in the CSI report and determine a second number of repetitions if the CQI is below the threshold. The number of repetitions associated with the CSI reporting can be RRC configured, signaled in a MAC CE, and/or signaled in DCI.

Figure 6:
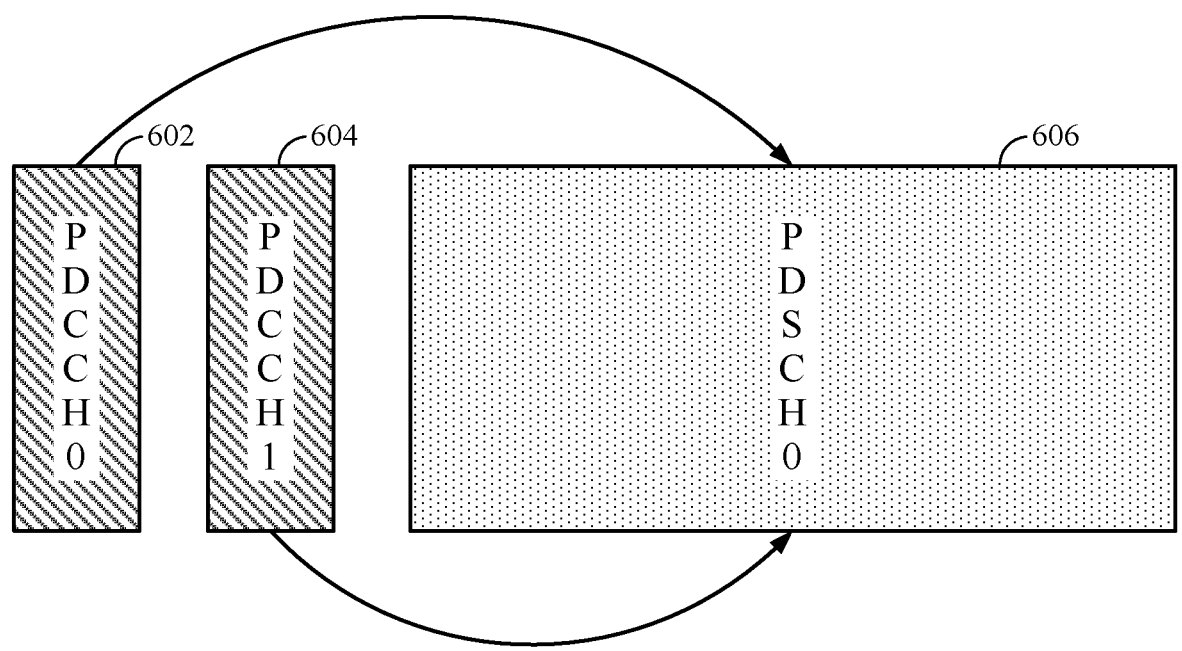
FIG. 6 shows an example of PDCCH repetitions for causal scheduling a physical downlink shared channel (PDSCH), in accordance with certain aspects of the present disclosure.

As discussed above, multiple PDCCH repetitions may schedule the same PDSCH and/or PUSCH. PDCCH repetitions affect the UE HARQ processing timeline. In HARQ processing timelines, $K_0$ denotes for the delay (e.g., a first number of slots) between a DL grant and corresponding downlink data (PDSCH) reception; $K_1$ denotes the delay (e.g., in slots) between DL data reception and corresponding ACK transmission on UL; $K_2$ denotes the delay (e.g., a second number of slots) between UL grant reception in DL and UL data (PUSCH) transmission; N1 denotes the duration (e.g., number of OFDM symbols) required for UE processing from the end of PDSCH reception to the earliest possible start of the corresponding ACK/NACK transmission from UE perspective; and N2 denotes the duration (e.g., number of OFDM symbols) required for UE processing from the end of PDCCH containing the UL grant reception to the earliest possible start of the corresponding PUSCH transmission from UE perspective FIG. 6 shows an example of PDCCH repetitions for causal scheduling a PDSCH 606, in which the PDSCH 606 is not transmitted before any of the PDCCH repetitions 602, 604 scheduling the PDSCH 606. In causal PDSCH scheduling with PDCCH repetitions, the $K_0$ becomes with respect to the last PDCCH repetition (e.g., PDCCH 604), while $K_1$ and $N_1$ are not impacted. Thus, the BS schedules, and the UE is configured/scheduled/indicated) to monitor the PDSCH 606 after a first duration (e.g., number of slots) $K_0$ relative to receiving the last PDCCH 604 repetition and to send HARQ feedback for the PDSCH 606 after a second duration (e.g., number of slots) $K_1$ after receiving the PDSCH 606.

Figure 7:
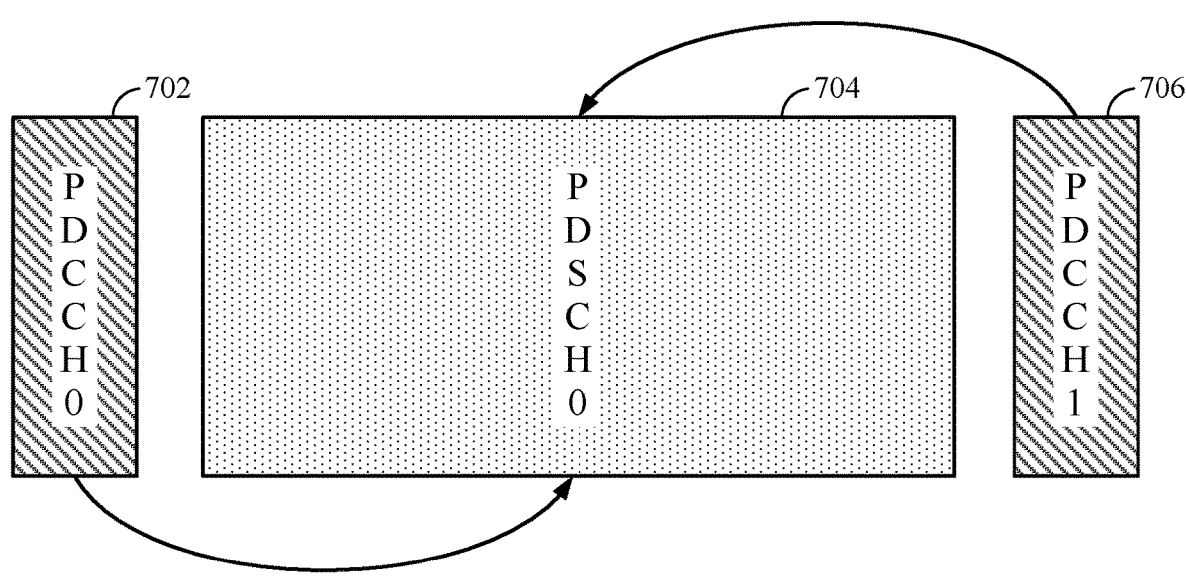
FIG. 7 shows an example of PDCCH repetitions for non-causal scheduling a PDSCH, in accordance with certain aspects of the present disclosure.
Figure 8:
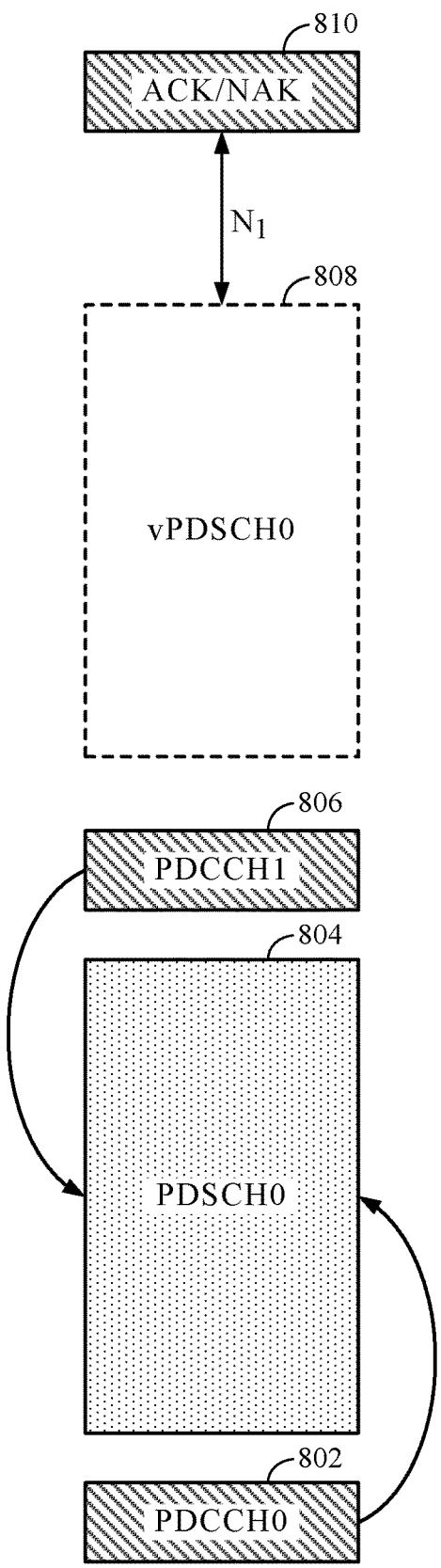
FIG. 8 shows an example of PDCCH repetitions for non-causal scheduling a PDSCH, in accordance with certain aspects of the present disclosure.

FIG. 7 shows an example of PDCCH repetitions (e.g., PDCCHs 702, 706) for partially non-causal scheduling a PDSCH 704, in which some PDCCH repetitions (e.g., PDCCH 706) are transmitted/received after the PDSCH 704 scheduled by the PDCCH 706. In partially non-causal PDSCH scheduling (or fully non-causal) with PDCCH repetitions (e.g., PDCCHs 802, 806), $K_0$ becomes with respect to the last PDCCH 806 repetition previous to the PDSCH 804 as shown in FIG. 8. $K_1$ and $N_1$ become with respect to a duration referred to as a "virtual" PDSCH 808 transmission that is the same length as the PDSCH 804, but in which data is not actually transmitted, as shown in FIG. 8. Thus, the BS schedules, and the UE is configured/scheduled) to monitor the PDSCH 804 no sooner than a first duration (e.g., number of slots) $K_0$ relative to receiving the last PDCCH 806 repetition and to send HARQ feedback 810 for the PDSCH 804 no sooner than a second duration (e.g., number of slots or symbols) $N_1$ for a virtual PDSCH 808 equal to the length of the PDSCH 804 and starting no earlier than the last PDCCH 806 repetition, plus a duration (e.g., number of slots or symbols) $N_1$ after the virtual PDSCH 808.

Figure 9:
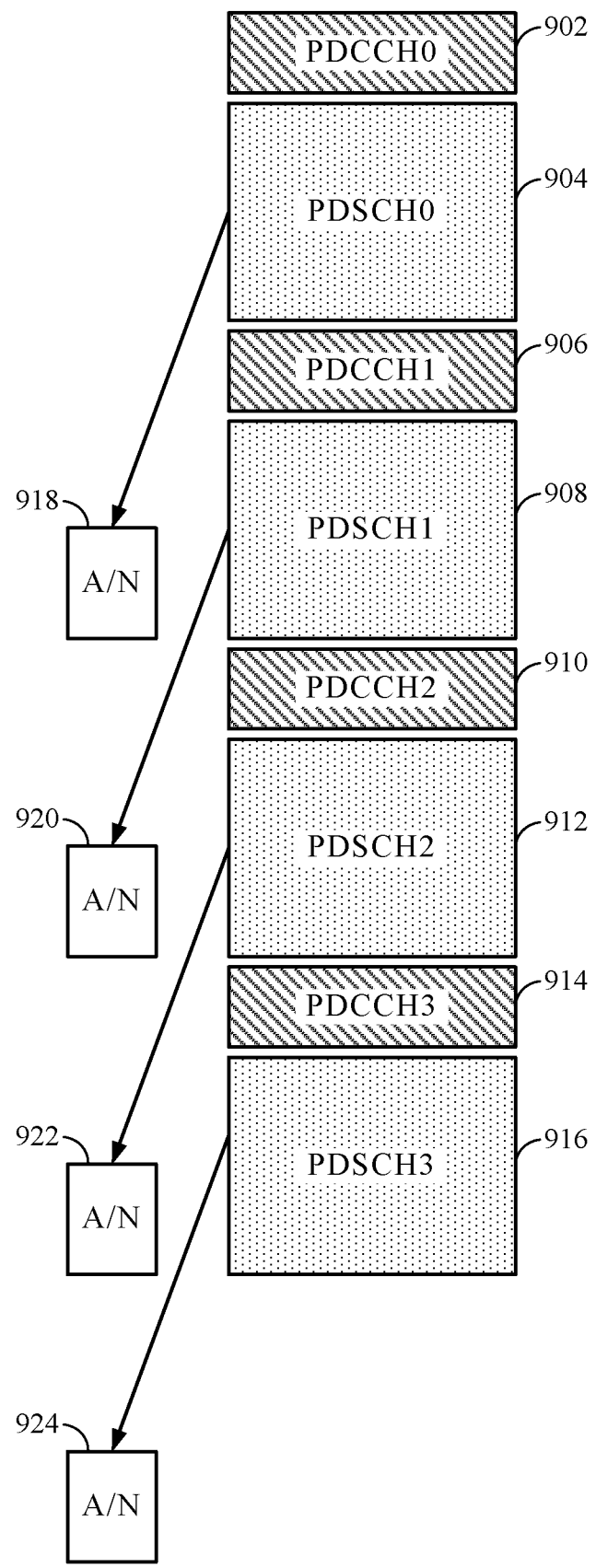
FIG. 9 shows an example of hybrid automatic repeat request (HARQ) resources configured for each PDSCH, in accordance with certain aspects of the present disclosure.
Figure 10:
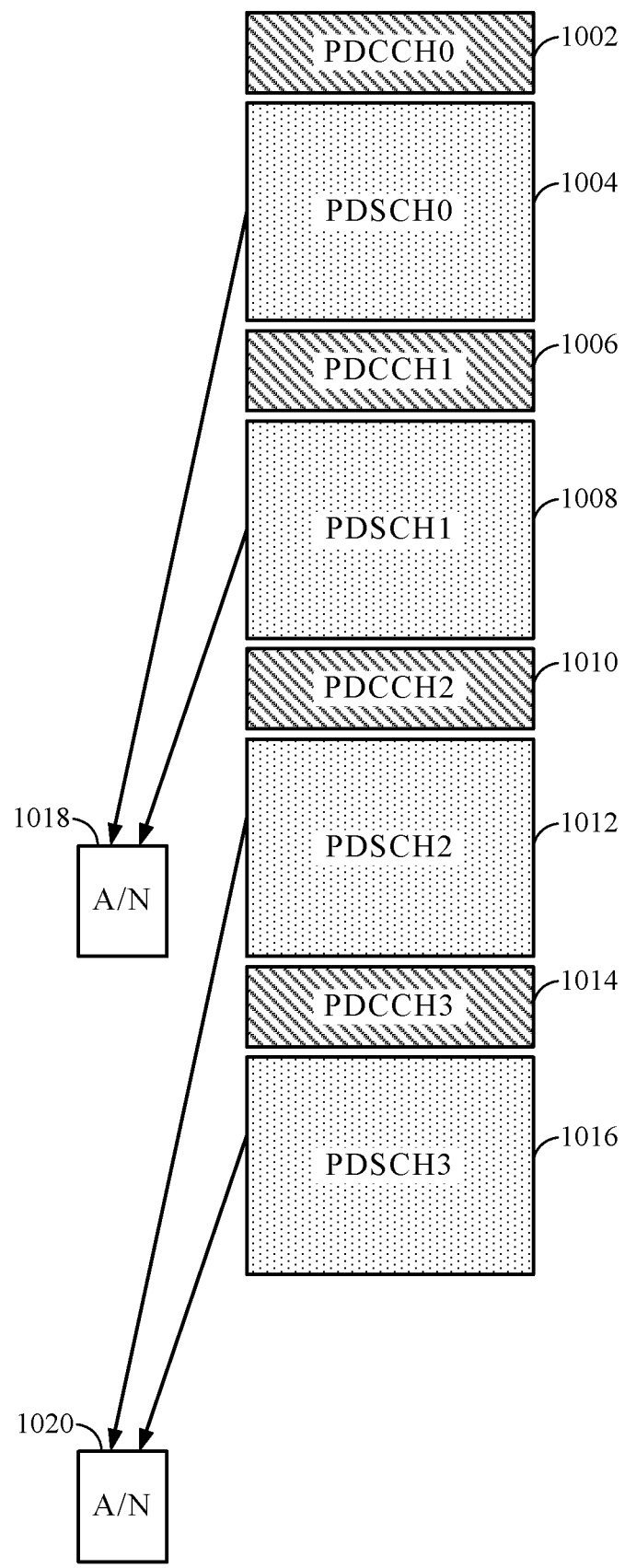
FIG. 10 shows an example of HARQ resources configured for a group of PDSCH, in accordance with certain aspects of the present disclosure.

According to certain aspects, the BS configures/schedules the UE with HARQ resources for sending UL HARQ feedback (ACK or negative ACK (NACK)) for a PDSCH or a plurality of PDSCHs scheduled by the PDCCHs. The PDSCH may be repeated, with a same transport block transmitted in each of the repeated PDSCH. In some examples, the UE has a HARQ resources to provide HARQ A/N 918, 920, 922, 924 for each of the PDSCHs 904, 908, 912, 916, respectively, scheduled by the PDCCHs 902, 906, 910, 914, respectively, as shown in FIG. 9. In the example in FIG. 9, the UE has resources configured to provide the HARQ feedback separately for each PDSCH. In some examples, the UE has HARQ resources to provide HARQ A/N 1018, 1020 for groups of PDSCHs 1004, 1008 and PDSCHs 1012 and 1016, respectively, as shown in FIG. 10. The HARQ resources may be indicated in the first PDCCH of the group (e.g., PDCCHs 1002 and 1010), or in the last PDCCH of the group (e.g., PDCCHs 1006 and 1014).

Figure 11:
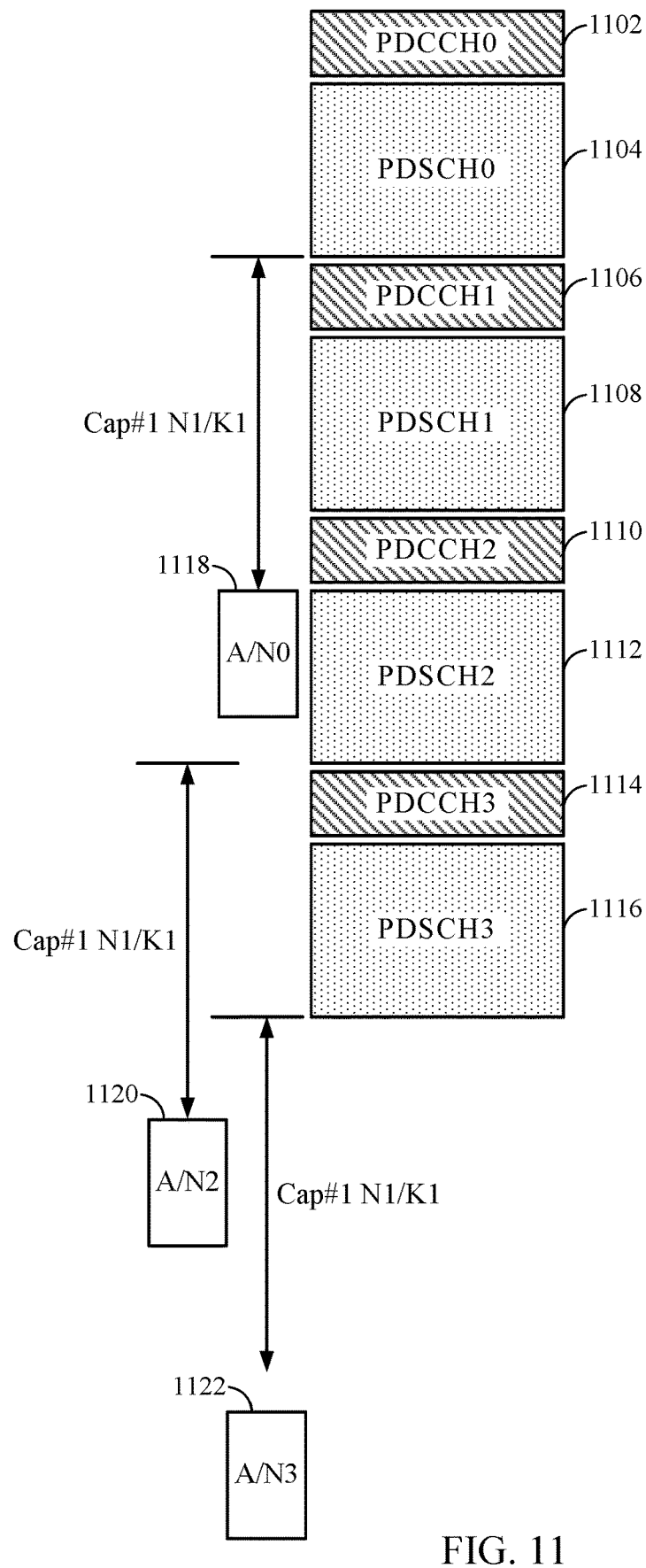
FIG. 11 shows an example of HARQ resources configured based on UE processing capability, in accordance with certain aspects of the present disclosure.

In some examples, a PDCCH may or may not indicate the HARQ resources. Instead, each HARQ resource, once provided, covers all outstanding PDSCHs that satisfy the UE processing timeline as shown in FIG. 11. The UE may have multiple processing time capabilities. The UE may report the UE capability and/or UE processing timeline to the BS during RRC configuration. For example, as shown in FIG. 11, A/N 1118 is indicated by PDCCH 1102 to provide HARQ feedback for PDSCH 1104, which is the only PDSCH satisfying the processing timeline for the UE's capability (e.g., Cap #1) for the A/N 1118. Another A/N resource (e.g., A/N1, not shown) which may be indicated by PDCCH 1106 does not carry any feedback. A/N 1120 is indicated by PDCCH 1110 and provides HARQ feedback for the PDSCH 1108 and PDSCH 1112. A/N 1122 is indicated by PDCCH 1114 and provides HARQ feedback for the PDSCH 1116.

In some examples, there may be one A/N feedback for each PDSCH, or one aggregated A/N feedback for all PDSCHs that are covered The HARQ resource options may be applicable to both frequency division duplexing (FDD) system and time division duplexing (TDD) systems.

According to certain aspects, DMRS ports may be quasi-colocated (QCL'd). Quasi-colocated DMRS ports share a set of quasi-colocation (QCL) parameters. The set of parameters can be associated with a QCL-type. The QCL-type may be associated with a combination (e.g., set) of QCL parameters. In some examples, a QCL-TypeA indicates the DMRS ports are QCL'd with respect to Doppler shift, Doppler spread, average delay, and delay spread; QCL-TypeB indicates the DMRS ports are QCL with respect to Doppler shift, and Doppler spread; QCL-TypeC indicates the DMRS are QCL with respect to average delay and Doppler shift; and QCL-TypeD indicates the DMRS ports are QCL with respect to Spatial Rx parameter. Different groups of DMRS ports can share different sets of QCL parameters.

PDCCH repetitions may use different CORESETs. The UE can be configured to assume that the DMRS of the REGs of more than one CORESET are either QCL'd with respect to spatial parameters, delay spread/shift parameters, Doppler spread/shift parameters, average gain parameters, or a combination thereof, or assume that the DMRS are transmitted using the same DMRS port. Either one of these associations of the DMRS between the CORESETs can be configured/indicated semi-static, or through MAC CE, DCI, and/or implicitly.

In some examples, the UE may be configured implicitly based on a search space set or a group of search space sets associated with the different CORESETs. The UE may be configured with a SS set which is associated with multiple CORESETs. The UE may be configured with multiple SS sets and an additional structure creates groups of sets. Additional signaling may indicate how the CORESETs are associated with mode 1 or 2 by repetition across time, across frequency, across space, or a combination therefore. In either case, the UE understands that the DMRS of the REGs of these CORESETs have DMRS which are either QCLed or the same port, and are related in some way affecting the DMRS structure. According to certain aspects, the association of the DMRS for different CORESETs may be associated with the domain in which the repetitions occur.

When two CORESETs are associated to provide some kind of PDCCH repetition, and are configured on the same PRBs but in different OFDM symbols (i.e., for repetition in time), the DMRS port frequency domain may be staggered across the CORESETs. For example, in the first CORESET, DMRS is in REs 1, 5, 9, and the next are in 2, 6, 10, then 3, 7, 11, and then again 1, 5, 9, and so on. Thus, for different CORESETs that use the same frequency resources and different time resources, the DMRS for the different CORESETs use different frequency resource patterns within the frequency resources of the CORESETs, the different frequency resource patterns associated with different subcarrier offsets.

When two CORESETs are associated to provide some kind of PDCCH repetition, and are configured on the same OFDM symbols but in different PRBs (i.e., for repetition in frequency), the frequency domain precoder may be cycled across CORESET for providing additional diversity gain. For example, CORESET 1 is transmitted with a specific set of precoders, and CORESET 2 is transmitted with another set of precoders which are disjoint from the first set, and so on. If the UE is configured to assume the same port across the repetitions in frequency, the UE may need to be aware of the set of precoders used and the ordering. The UE may be configured to assume that the same wideband precoder across the CORESETs, for example, to perform joint decoding.

When two CORESETs are associated to provide some kind of PDCCH repetition, and are configured on different OFDM symbols and different PRBs (i.e., for repetition in frequency and time), both RE-level frequency domain staggering and frequency-domain CORESET cycling may be configured.

When two CORESETs are associated to provide some kind of PDCCH repetition, and are configured on the same OFDM symbols, the same PRBs, and different DMRS ports (i.e., repetition in space), a specific transmission scheme may be configured, such as space-frequency block coding (SFBC), to precode the two DMRS ports accordingly. In this case, one SS set is configured with two CORESETS which are "on top of each other". The UE may assume that the DMRS of the CORESETs are QCL associated or are transmitted with the same port, or that a spatial multiplexing (e.g. SFBC or closed-loop precoding) can be assumed.

In addition to the above repetition types, the PDCCH repetition may have same or different DCI content, aggregation levels, DCI fields, and/or values of DCI fields.

If the different CORESETs have PDCCH with the same DCI content and same aggregation levels, the DMRS for the different CORESETs use different frequency resource patterns within the frequency resources of the CORESETs, the different frequency resource patterns associated with different subcarrier offsets. For example, RE-level frequency domain cycling may be associated with the symbol index that the corresponding CORESET appears in or with the QCL identifier (ID) of the CORESET.

If the different CORESETs have PDCCH with the same DCI content and different aggregation levels, the DMRS for the different CORESETs use different frequency precoders. For example, depending on the AL, the DMRS of the corresponding payload may have different comb type. The PDCCH energy per RE (EPRE) power level may be configured. An additional field in RRC signaling can enable DMRS dropping in the CORESETs appearing in later symbols (in the case of "repetition in time"), for example to decrease the DMRS overhead and coding rate (e.g., higher AL).

For different CORESETs that have PDCCH with different DCI pointing to a same PDSCH and the different DCI have different fields or different values of the same fields, presence of the different fields or the different values of the same fields indicates different DMRS structures for the different CORESETs. The different DMRS structures are associated with different subcarrier offsets, different frequency domain precoders, different DMRS scrambling IDs, different DMRS symbol locations within the CORESETs, and/or different presence or absence of one or more DMRS in the CORESETs. For example, the value of the different fields may be used to adjust/randomize the DMRS structure of each repetition. The repetition counter may be used to signal the RE-level frequency domain DMRS cycling, or the precoder set used in the CORESET.

Figure 12:
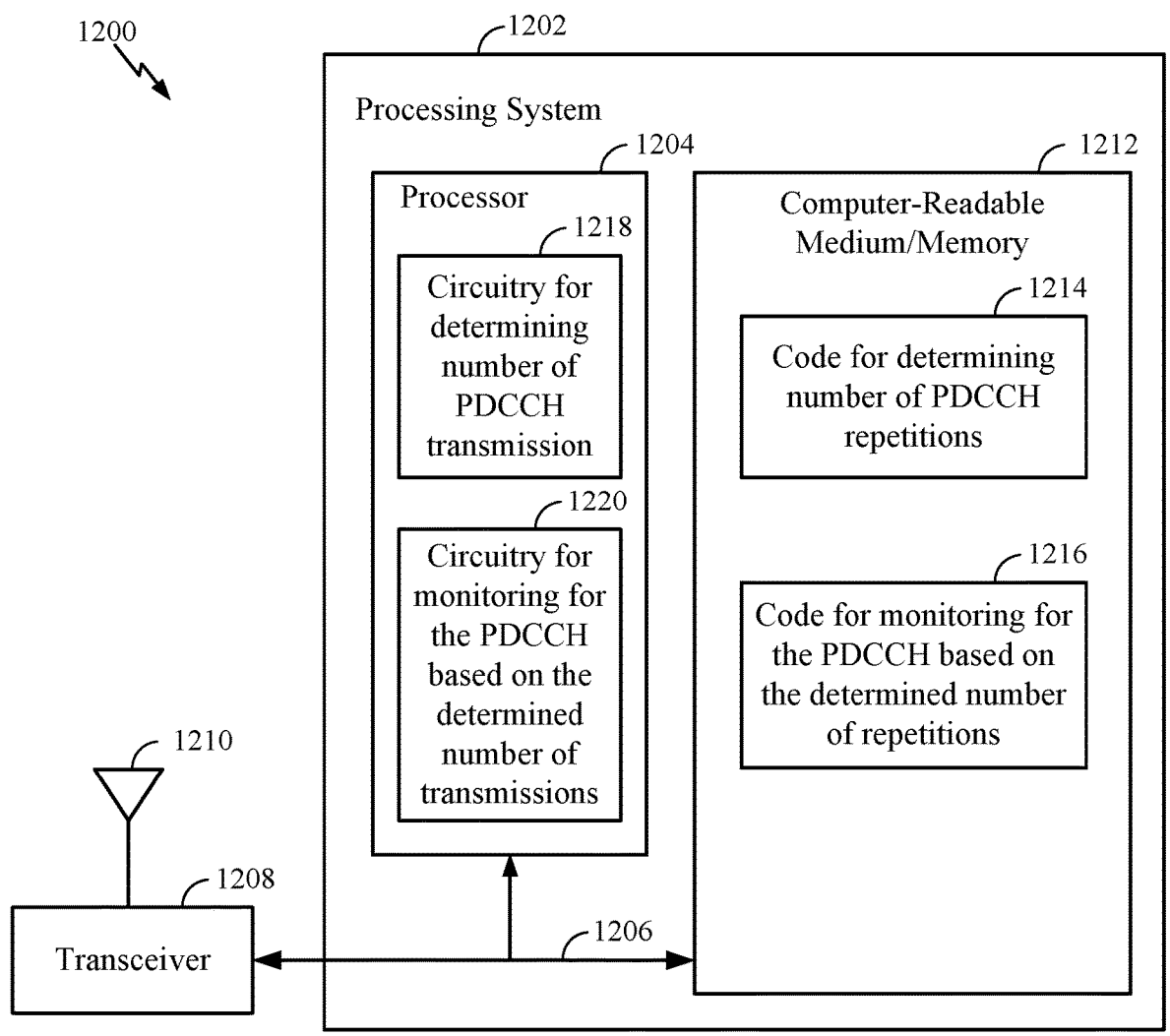
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 4. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer executable code) that when executed by the processor 1204, cause the processor 1204 to perform the operations illustrated in FIG. 4, or other operations for performing the various techniques discussed herein for PDCCH repetitions. In certain aspects, computer-readable medium/memory 1212 stores code 1214 for determining the number of PDCCH repetitions and code 1216 for monitoring for the PDCCH based on the determined number of repetitions, in accordance with aspects of the present disclosure. The processor 1204 includes circuitry 1218 for determining the number of PDCCH repetitions and circuitry 1220 for monitoring for the PDCCH based on the determined number of repetitions, in accordance with aspects of the present disclosure.

Figure 13:
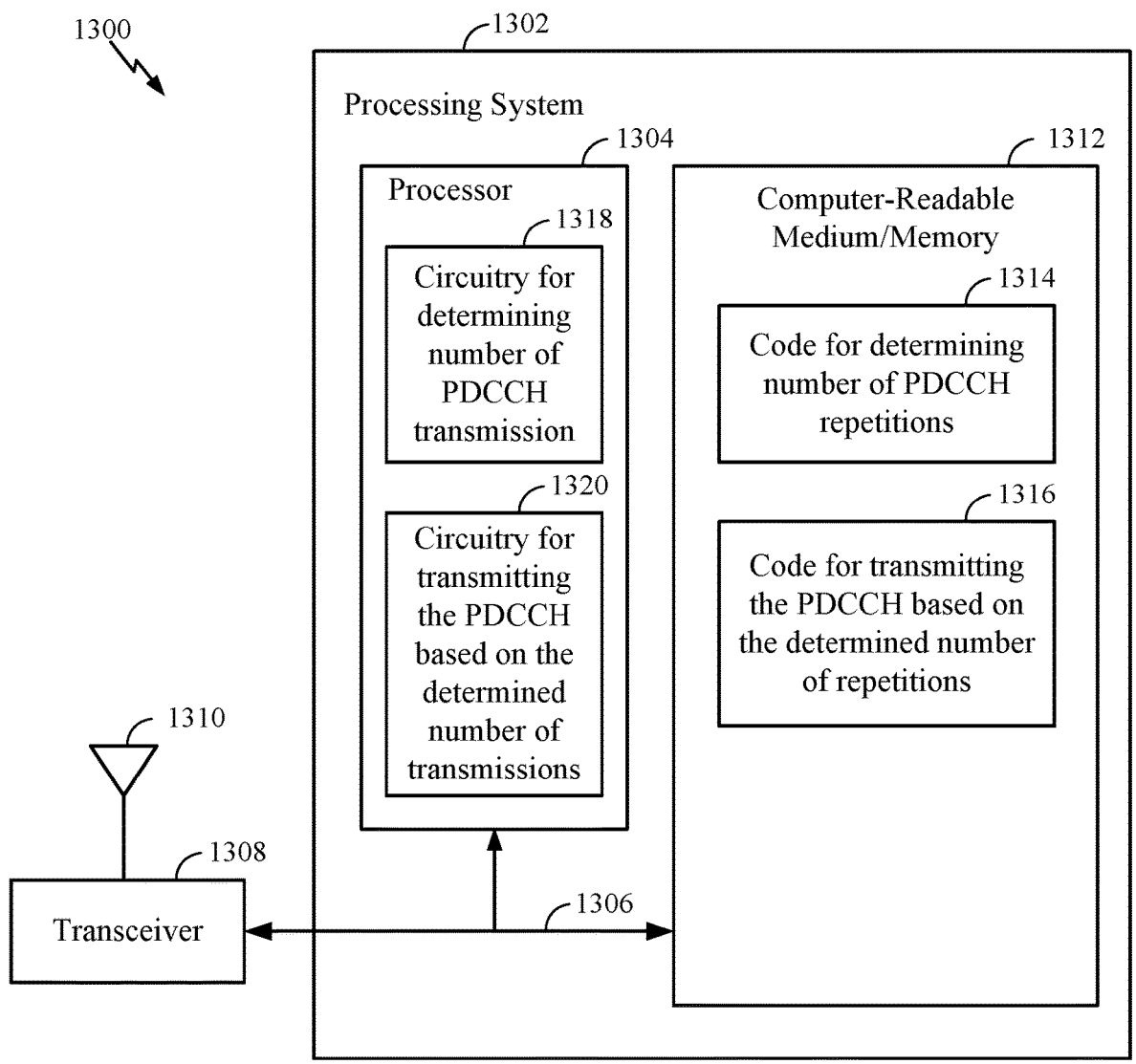
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 5. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/ memory 1312 is configured to store instructions (e.g., computer executable code) that when executed by the processor 1304, cause the processor 1304 to perform the operations illustrated in FIG. 5, or other operations for performing the various techniques discussed herein for PDCCH repetitions. In certain aspects, computer-readable medium/memory 1312 stores code for code 1314 for determining the number of PDCCH repetitions and code 1316 for transmitting the PDCCH based on the determined number of repetitions, in accordance with aspects of the present disclosure. The processor 1304 includes circuitry 1318 for determining the number of PDCCH repetitions and circuitry 1320 for transmitting the PDCCH based on the determined number of repetitions, in accordance with aspects of the present disclosure.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Figure 14:
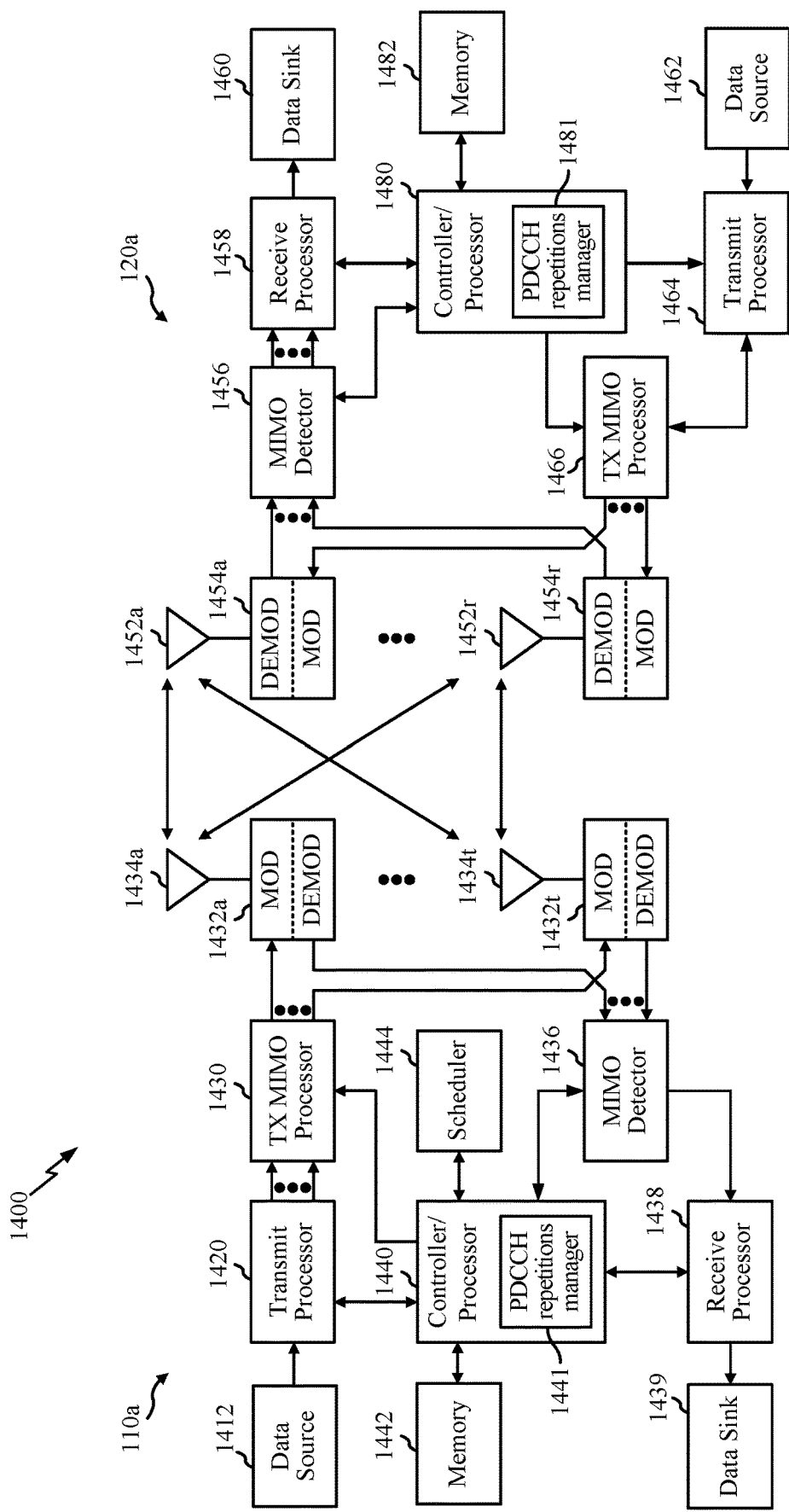
FIG. 14 is a block diagram conceptually illustrating a design of an example BS and UE, in accordance with certain aspects of the present disclosure.

FIG. 14 illustrates example components of BS 110a and UE 120a (as depicted in the wireless communication network 1000 in FIG. 1), which may be used to implement aspects of the present disclosure. For example, antennas 1452, processors 1466, 1458, 1464, and/or controller/processor 1480 of the UE 120a and/or antennas 1434, processors 1420, 1460, 1438, and/or controller/processor 1440 of the BS 110*a* may be used to perform the various techniques and methods described herein for PDCCH with repetitions.

At the BS 110*a*, a transmit processor 1420 may receive data from a data source 1412 and control information from a controller/processor 1440. The control information may be for the physical broadcast channel (PBCH), physical control format indicator channel (PCFICH), physical HARQ indicator channel (PHICH), PDCCH, group common PDCCH (GC PDCCH), etc. The data may be for the PDSCH, etc. The processor 1420 may process (e.g., encode and symbol map) the data and control information to obtain data symbols and control symbols, respectively. The processor 1420 may also generate reference symbols, e.g., for the primary synchronization signal (PSS), secondary synchronization signal (SSS), and cell-specific reference signal (CRS). A transmit (TX) multiple-input multiple-output (MIMO) processor 1430 may perform spatial processing (e.g., precoding) on the data symbols, the control symbols, and/or the reference symbols, if applicable, and may provide output symbol streams to the modulators (MODs) 1432*a* through 1432*t*. Each modulator 1432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1432*a* through 1432*t* may be transmitted via the antennas 1434*a* through 1434*t*, respectively.

At the UE 120*a*, the antennas 1452*a* through 1452*r* may receive the downlink signals from the base station 110*a* and may provide received signals to the demodulators (DEMODs) in transceivers 1454*a* through 1454*r*, respectively. Each demodulator 1454 may condition (e.g., filter, amplify, downconvert, and digitize) a respective received signal to obtain input samples. Each demodulator may further process the input samples (e.g., for OFDM, etc.) to obtain received symbols. A MIMO detector 1456 may obtain received symbols from all the demodulators 1454*a* through 1454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 1480.

On the uplink, at UE 120*a*, a transmit processor 1464 may receive and process data (e.g., for the PUSCH) from a data source 1462 and control information (e.g., for the physical uplink control channel (PUCCH) from the controller/processor 1480. The transmit processor 1464 may also generate reference symbols for a reference signal (e.g., for the sounding reference signal (SRS)). The symbols from the transmit processor 1464 may be precoded by a TX MIMO processor 1466 if applicable, further processed by the demodulators in transceivers 1454*a* through 1454*r* (e.g., for SC-FDM, etc.), and transmitted to BS 110*a*. At the BS 110*a*, the uplink signals from the UE 120*a* may be received by the antennas 1434, processed by the modulators 1432, detected by a MIMO detector 1436 if applicable, and further processed by a receive processor 1438 to obtain decoded data and control information sent by the UE 120*a*. The receive processor 1438 may provide the decoded data to a data sink 1439 and the decoded control information to the controller/processor 1440.

The controllers/processors 1440 and 1480 may direct the operation at the BS 110*a* and the UE 120*a*, respectively. The processor 1440 and/or other processors and modules at the BS 110 may perform or direct the execution of processes for the techniques described herein. As shown in FIG. 14, the UE 120*a* includes a PDCCH repetition manager 1481. The PDCCH repetition manager 1481 may be configured to determine a number of PDCCH repetitions scheduling the UE 120*a* for a PDSCH transmission and/or a PUSCH transmission, in accordance with aspects of the present disclosure. Each PDCCH repetition may have a same DCI payload, a same AL, and/or a grant for a same data channel allocation. The PDCCH repetition manager 1481 may be configured to monitor PDCCH repetitions based on the determination, in accordance with aspects of the present disclosure. As shown in FIG. 14, the BS 110*a* has a PDCCH repetition manager 1441. The PDCCH repetition manager 1441 may be configured to configure the UE 120*a* semi-statically with the number of repetitions, signal the number of repetitions to the UE 120*a*, or implicitly signal or configure the number of PDCCH repetitions. The BS 110*a* may schedule the UE 120*a* for the PDSCH and HARQ ACK resources for the PDSCH scheduled by the PDCCH repetitions. The BS 110*a* may transmit DMRS based on the PDCCH repetitions.

The memories 1442 and 1482 may store data and program codes for BS 110 and UE 120, respectively. A scheduler 1444 may schedule UEs for data transmission on the downlink and/or uplink.

EXAMPLE EMBODIMENTS

Embodiment 1: A method for wireless communications, by a user equipment (UE), comprising determining a number of repetitions of a physical downlink control channel (PDCCH), each of the PDCCH repetitions having at least one of: a same downlink control information (DCI) payload, a same aggregation level, or a grant for a same data channel allocation; and monitoring for the PDCCH based on the determined number of repetitions.

Embodiment 2: The method of Embodiment 1, wherein determining the number of repetitions comprises receiving signaling indicating the number of repetitions.

Embodiment 3: The method of Embodiment 2, wherein the signaling comprises at least one of: radio resource control (RRC) signaling, DCI, or a medium access control (MAC) control element (CE).

Embodiment 4: The method of Embodiments 2 or 3, wherein the indication comprises an indication of a number of repetitions associated with each of one or more control resource sets (CORESETS) or one or more search spaces, and the determination of the number of repetitions is based on the indicated number of repetitions associated with the CORESET or search space monitored for the PDCCH.

Embodiment 5: The method of any of Embodiments 1-3, wherein the determination of the number of repetitions is based on a scrambling sequence of a received demodulation reference signal (DMRS) or PDCCH.

Embodiment 6: The method of any of Embodiments 1-3, wherein the method further comprises receiving a configuration for channel state information (CSI) reporting associated with a target block error rate (BLER), and the determination of the number of repetitions comprises determining a first number of repetitions when the target BLER is equal to or greater than a threshold and determining a second number of repetitions when the target BLER is below the threshold.

Embodiment 7: The method of any of Embodiments 1-3, wherein the method further comprises receiving a configuration for channel state information (CSI) reporting with a target block error rate (BLER), and the determination of the number of repetitions comprises determining a first number of repetitions when a channel quality indicator (CQI) equal to or greater than a threshold is reported in the CSI report and determining a second number of repetitions when the CQI is below the threshold.

Embodiment 8: The method of any of Embodiments 1-7, wherein each of the PDCCH repetitions is received before a physical downlink shared channel (PDSCH) scheduled by the PDCCHs, and the method further comprises monitoring the PDSCH after a first duration after receiving the last PDCCH repetition previous to the PDSCH and sending hybrid automatic repeat request (HARQ) feedback for the PDSCH no sooner than a second duration after receiving the PDSCH.

Embodiment 9: The method of any of Embodiments 1-7, wherein one or more of the PDCCH repetitions is received after a physical downlink shared channel (PDSCH) scheduled by the PDCCHs, and the method further comprises monitoring the PDSCH no sooner than a first duration after receiving the PDCCH repetition previous to the PDSCH.

Embodiment 10: The method of Embodiment 10, further comprising sending hybrid automatic repeat request (HARQ) feedback for the PDSCH no sooner than a second duration after the last PDCCH repetition, a duration equal to a length of the PDSCH, and no sooner than a first number of symbols after the duration equal to the length of the PDSCH.

Embodiment 11: The method of any of Embodiments 1-10, wherein each of the PDCCH repetitions is received before a physical uplink shared channel (PUSCH) scheduled by the PDCCHs and the method further comprises transmitting the PUSCH a fourth duration after receiving the last PDCCH repetition, and no sooner than a second number of symbols after the last PDCCH repetition Embodiment 12: The method of any of Embodiments 1-11, further comprising receiving an indication of resources, from a base station, for transmitting hybrid automatic repeat request (HARQ) feedback for a plurality of physical downlink shared channel (PDSCH) scheduled by a plurality of PDCCH.

Embodiment 13: The method of Embodiment 12, wherein the resources are configured to provide HARQ feedback separately for each PDSCH.

Embodiment 14: The method of Embodiment 12, wherein the resources are configured for providing HARQ feedback for a group of PDSCH, and the indication is received in the PDCCH scheduling the first or last PDSCH of the multiple PDSCH transmissions.

Embodiment 15: The method of any of Embodiments 1-14, wherein a same transport block is received in each of the plurality of PDSCH.

Embodiment 16: The method of any of Embodiments 1-15, wherein the monitoring comprises monitoring different PDCCH repetitions in different control resource sets (CORESETs), and the method further comprises assuming demodulation reference signals (DMRS) of the different CORESETs share one or more quasi-colocation (QCL) parameters, are transmitted using a same DMRS port, or both.

Embodiment 17: The method of Embodiment 16, wherein the different CORESETs use the same frequency resources and different time resources, include PDCCH with the same DCI content and different aggregation levels, or both, and the DMRS for the different CORESETs use different frequency resource patterns within the frequency resources of the CORESETs, the different frequency resource patterns associated with different subcarrier offsets.

Embodiment 18: The method of Embodiment 16, wherein the different CORESETs use the same time resources and different frequency resources, include PDCCH with a same DCI content and a same aggregation level, or both, and the different CORESETs use different frequency domain precoders.

Embodiment 19: The method of Embodiment 16, wherein the different CORESETs use different time resources, different frequency resources, different frequency domain precoders, and different frequency resource patterns associated with different subcarrier offsets for DMRS within the frequency resources.

Embodiment 20: The method of Embodiment 16, wherein different CORESETs use the same time resources and the same frequency resources, and DMRS for the different CORESETs share one more QCL parameters or the DMRS for the different CORESETs are spatially multiplexed using different DMRS ports.

Embodiment 21: The method of Embodiment 20, wherein the different DMRS ports are multiplexed using space-frequency block coding (SFBC).

Embodiment 22: The method of any of Embodiments 1-21, wherein the different CORESETs have PDCCH with different DCI pointing a same physical downlink shared channel (PDSCH) and the different DCI have different fields or different values of the same fields, and presence of the different fields or the different values of the same fields indicates different DMRS structures for the different CORESETs.

Embodiment 23: The method of Embodiment 22, wherein the different DMRS structures are associated with at least one of: different subcarrier offsets, different frequency domain precoders, different DMRS scrambling identifiers (IDs), different DMRS symbol locations within the CORESET, or different presence or absence of one or more DMRS in the CORESET.

Embodiment 24: A method for wireless communications, by a base station (BS), comprising determining a number of repetitions of a physical downlink control channel (PDCCH) to a user equipment (UE); and transmitting the PDCCH to the UE based on the determined number of repetitions.

Embodiment 25: The method of Embodiment 24, wherein the PDCCH is repeated in at least one of: the time domain, the frequency domain, or the spatial domain.

Embodiment 26: The method of Embodiments 24 or 25, wherein each of the PDCCH repetitions has at least one of: a same downlink control information (DCI) payload, a same aggregation level, or a grant for a same data channel allocation but with different fields.

Embodiment 27: The method of any of Embodiments 24-26, wherein each of the PDCCH repetitions is transmitted using a control resource set (CORESET).

Embodiment 28: The method of Embodiment 27, wherein the method further comprises sending an indication of a number of repetitions associated with each of the CORESETs, and the determination of the number of repetitions is based on the indicated number of repetitions associated with the CORESET monitored for the PDCCH.

Embodiment 29: The method of Embodiment 27, wherein the indication of the number of repetitions is via radio resource control (RRC) signaling or a medium access control (MAC) control element (CE).

Embodiment 30: The method of Embodiment 24, wherein the determination of the number of repetitions is based on a search space configured for the PDCCH.

Embodiment 31: The method of Embodiment 24, wherein determination of the number of repetitions is based on a scrambling sequence of a transmitted demodulation reference signal (DMRS) or PDCCH.

Embodiment 32: The method of Embodiment 24, wherein the number of repetitions is indicated via a signaled radio resource control (RRC) parameter.

Embodiment 33: The method of Embodiment 24, wherein the method further comprises configuring the UE for channel state information (CSI) reporting with a target block error rate (BLER), and the determination of the number of repetitions comprises: determining a first number of repetitions if the target BLER is equal to or greater than a threshold, and determining a second number of repetitions if the target BLER is below the threshold.

Embodiment 34: The method of Embodiment 33, wherein the number of repetitions is determined once a CSI report is triggered.

Embodiment 35: The method of Embodiment 24, wherein the method further comprises configuring the UE for channel state information (CSI) reporting with a target block error rate (BLER), and the determination of the number of repetitions comprises: determining a first number of repetitions if a channel quality indicator (CQI) equal to or greater than a threshold is reported in the CSI report, and determining a second number of repetitions if the CQI is below the threshold.

Embodiment 36: The method of any of Embodiments 24-35, wherein each of the PDCCH repetitions is transmitted before a physical downlink shared channel (PDSCH) scheduled by the PDCCHs, the PDSCH is scheduled a duration $K_0$ after the last PDCCH repetition, and the UE is scheduled to send hybrid automatic repeat request (HARQ) feedback for the PDSCH no sooner than a duration $K_1$ after the PDSCH.

Embodiment 37: The method of any of Embodiments 24-35, wherein one or more of the PDCCH repetitions is transmitted after a physical downlink shared channel (PDSCH) scheduled by the PDCCHs, the PDSCH is scheduled no sooner than a duration $K_0$ relative to the last PDCCH repetition.

Embodiment 38: The method of any of Embodiments 24-35, wherein one or more of the PDCCH repetitions is transmitted after a physical downlink shared channel (PDSCH) scheduled by the PDCCHs, hybrid automatic repeat request (HARQ) feedback for the PDSCH is scheduled for no sooner than a duration $K_1$ for a virtual PDSCH equal to the length of the PDSCH and starting no earlier than the last PDCCH repetition, and no sooner than a number of symbols $N_1$ after the virtual PDSCH.

Embodiment 39: The method of any of Embodiments 24-35, wherein each of the PDCCH repetitions is transmitted before a physical uplink shared channel (PUSCH) scheduled by the PDCCHs, the UE is scheduled to transmit the PUSCH a duration $K_2$ after the last PDCCH repetition, and no sooner than a number of symbols $N_2$ after the last PDCCH repetition.

Embodiment 40: The method of any of Embodiments 24-35, wherein the method further comprises sending an indication of resources, to the UE, for transmitting hybrid automatic repeat request (HARQ) feedback for a plurality of physical downlink shared channel (PDSCH) scheduled by a plurality of PDCCH.

Embodiment 41: The method of Embodiment 40, wherein the resources schedule the UE to provide HARQ feedback separately for each PDSCH.

Embodiment 42: The method of Embodiment 40, wherein the resources schedule the UE to provide HARQ feedback for a group of PDSCH, and the indication is provided in the PDCCH scheduling the first or last PDSCH of the multiple PDSCH transmissions.

Embodiment 43: The method of any of Embodiments 24-42, wherein a same transport block is transmitted in each of the plurality of PDSCH.

Embodiment 44: The method of Embodiment 40, wherein the method further comprising receiving an indication, from the UE, of a processing capability of the UE, and the indication of resources is based on the capability of the UE.

Embodiment 45: The method of any of Embodiments 24-44, wherein the BS transmits different PDCCH repetitions in different CORESETs, and the demodulation reference signals (DMRS) of the different CORESETs share one or more quasi-colocation (QCL) parameters or are transmitted using a same DMRS port.

Embodiment 46: The method of Embodiment 45, further comprising configuring the UE with the different CORESETs via semi-static signaling, downlink control information (DCI), or a medium access control (MAC) control element (CE).

Embodiment 47: The method of Embodiment 45, further comprising configuring the UE with the different CORESETs implicitly based on a search space set or a group of search space sets associated with the different CORESETs.

Embodiment 48: The method of Embodiment 45, wherein different CORESETs at least one of: use the same frequency resources and different time resources, or have PDCCH with a same downlink control information (DCI) content and a different aggregation level, and the DMRS for the different CORESETs use different frequency resource patterns within the frequency resources of the CORESETs, the different frequency resource patterns associated with different subcarrier offsets.

Embodiment 49: The method of Embodiment 45, wherein different CORESETs at least one of: use the same time resources and different frequency resources, or have PDCCH with a same downlink control information (DCI) content and a same aggregation level, and the different CORESETs use different frequency domain precoders.

Embodiment 50: The method of Embodiment 45, wherein different CORESETs use the different time resources and different frequency resources, and the different CORESETs use different frequency domain precoders and different frequency resource patterns for the DMRS within the frequency resources of the CORESETs, the different frequency resource patterns associated with different subcarrier offsets.

Embodiment 51: The method of Embodiment 45, wherein different CORESETs use the same time resources and the same frequency resources, and the DMRS for the different CORESETs share one more quasi-colocation (QCL) parameters or the DMRS for the different CORESETs are spatially multiplexed using different DMRS ports.

Embodiment 52: The method of Embodiment 51, wherein the different DMRS ports are multiplexed using space-frequency block coding (SFBC).

Embodiment 53: The method of Embodiment 45, wherein different CORESETs have PDCCH with different downlink control information (DCI) pointing a same physical downlink shared channel (PDSCH) and the different DCI have different fields or different values of the same fields, and presence or absence of the different fields or the different values of the same fields indicates different DMRS structures for the different CORESETs.

Embodiment 54: The method of Embodiment 53, wherein the different DMRS structures are associated with at least one of: different subcarrier offsets, different frequency domain precoders, different DMRS scrambling IDs, different DMRS symbol locations within the CORESET, or different presence or absence of one or more DMRS in the CORESETs.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4 and FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, by a user equipment (UE), comprising:
   determining a number of repetitions of a physical downlink control channel (PDCCH) transmission, wherein each of the repetitions of the PDCCH transmission has at least one of: a same downlink control information (DCI) payload, a same aggregation level, or a grant for a same data channel allocation;
   monitoring the PDCCH based on the determined number of repetitions of the PDCCH transmission, wherein the monitoring includes monitoring different repetitions of the PDCCH transmission of the number of repetitions of the PDCCH transmission in different control resource sets (CORESETs); and
   assuming demodulation reference signals (DMRSs) of the different CORESETs share one or more quasi-colocation (QCL) parameters, are transmitted using a same DMRS port, or both.

2. The method of claim 1, wherein determining the number of repetitions of the PDCCH transmission comprises receiving signaling indicating the number of repetitions of the PDCCH transmission.

3. The method of claim 2, wherein the signaling comprises at least one of: radio resource control (RRC) signaling, DCI, or a medium access control (MAC) control element (CE).

4. The method of claim 2, wherein:
   the signaling indicating the number of repetitions of the PDCCH transmission comprises an indication of the number of repetitions of the PDCCH transmission associated with one or more CORESETs or one or more search spaces.

5. The method of claim 1, wherein the determination of the number of repetitions of the PDCCH transmission is based on a scrambling sequence of a DMRS or PDCCH.

6. The method of claim 1, wherein:
   the method further comprises receiving a configuration for channel state information (CSI) reporting associated with a target block error rate (BLER), and
   the determination of the number of repetitions of the PDCCH transmission comprises:
      determining a first number of repetitions of the PDCCH transmission when the target BLER is equal to or greater than a threshold; and
      determining a second number of repetitions of the PDCCH transmission when the target BLER is below the threshold.

7. The method of claim 1, wherein:
   the method further comprises receiving a configuration for channel state information (CSI) reporting with a target block error rate (BLER), and
   the determination of the number of repetitions of the PDCCH transmission comprises:
      determining a first number of repetitions of the PDCCH transmission when a channel quality indicator (CQI) equal to or greater than a threshold is reported in a CSI report, and
      determining a second number of repetitions of the PDCCH transmission when the CQI is below the threshold.

8. The method of claim 1, wherein:
   each of the repetitions of the PDCCH transmission is received before a physical downlink shared channel (PDSCH) scheduled by the number of repetitions of the PDCCH transmission, and
   the method further comprises:
      monitoring the PDSCH after a first duration after receiving the last repetition of the PDCCH transmission of the number of repetitions of the PDCCH transmission previous to the PDSCH, and
      sending hybrid automatic repeat request (HARQ) feedback for the PDSCH no sooner than a second duration after receiving the PDSCH.

9. The method of claim 1, wherein:
   one or more of the number of repetitions of the PDCCH transmission is received after a physical downlink shared channel (PDSCH) scheduled by the number of repetitions of the PDCCH transmission, and
   the method further comprises monitoring the PDSCH no sooner than a first duration after receiving a last repetition of the PDCCH transmission, of the number of repetitions of the PDCCH transmission, previous to the PDSCH.

10. The method of claim 9, further comprising sending hybrid automatic repeat request (HARQ) feedback for the PDSCH no sooner than a second duration after the last repetition of the PDCCH transmission and no sooner than a third duration, wherein the second duration is equal to a length of the PDSCH.

11. The method of claim 10, wherein:
    each of the number of repetitions of the PDCCH transmission is received before a physical uplink shared channel (PUSCH) scheduled by the number of repetitions of the PDCCH transmission, and
    the method further comprises transmitting a PUSCH a first duration after receiving the last repetition of the PDCCH transmission of the number of PDCCH repetitions and no sooner than a first number of symbols after the last repetition of the PDCCH transmission.

12. The method of claim 1, further comprising receiving an indication of resources, from a base station, for transmitting hybrid automatic repeat request (HARQ) feedback for a plurality of physical downlink shared channels (PDSCHs) scheduled by a plurality of repetitions of the PDCCH transmission.

13. The method of claim 12, wherein the resources are configured to provide HARQ feedback separately for each PDSCH of the plurality of PDSCHs.

14. The method of claim 12, wherein:
    the resources are configured for providing HARQ feedback for a plurality of PDSCHs, and
    the indication is received in the PDCCH scheduling a first or a last PDSCH of the plurality of PDSCHs.

15. The method of claim 12, wherein a same transport block is received in each of the plurality of PDSCHs.

16. The method of claim 1, wherein:
    the different CORESETs use identical frequency resources and different time resources, include a PDCCH transmission with a same DCI content and different aggregation levels, or both,
    the DMRSs for the different CORESETs use different frequency resource patterns within the frequency resources of the CORESETs, and
    the different frequency resource patterns are associated with different subcarrier offsets.

17. The method of claim 1, wherein:
    the different CORESETs use identical time resources and different frequency resources, include a PDCCH transmission with a same DCI content and a same aggregation level, or both, and
    the different CORESETs use different frequency domain precoders.

18. The method of claim 1, wherein the different CORESETs use different time resources, different frequency resources, different frequency domain precoders, and different frequency resource patterns associated with different subcarrier offsets for DMRS within the different frequency resources.

19. The method of claim 1, wherein:
    different CORESETs use identical time resources and identical frequency resources, and
    DMRSs for the different CORESETs share one more QCL parameters or the DMRS for the different CORESETs are spatially multiplexed using different DMRS ports.

20. The method of claim 19, wherein the different DMRS ports are multiplexed using space-frequency block coding (SFBC).

21. The method of claim 1, wherein:
    the different CORESETs have one or more PDCCHs with different DCI pointing a same physical downlink shared channel (PDSCH) and the different DCI have different fields or different values of the same fields, and
    a presence of the different fields or the different values of the same fields indicates different DMRS structures for the different CORESETs.

22. The method of claim 21, wherein the different DMRS structures are associated with at least one of: different subcarrier offsets, different frequency domain precoders, different DMRS scrambling identifiers (IDs), different DMRS symbol locations within the different CORESETs, or different presence or absence of one or more DMRS in the different CORESETs.

23. An apparatus for wireless communications, comprising:
    means for determining a number of repetitions of a physical downlink control channel (PDCCH) transmission, wherein each one of the number of repetitions of the PDCCH transmission has at least one of: a same downlink control information (DCI) payload, a same aggregation level, or a grant for a same data channel allocation;
    means for monitoring the PDCCH based on the determined number of repetitions of the PDCCH transmission, wherein the means for monitoring includes means for monitoring different repetitions of the PDCCH transmission of the number of repetitions of the PDCCH transmission in different control resource sets (CORESETs); and
    means for assuming demodulation reference signals (DMRSs) of the different CORESETs share one or more quasi-colocation (QCL) parameters, are transmitted using a same DMRS port, or both.

24. The apparatus of claim 23, wherein means for determining the number of PDCCH repetitions comprises means for receiving signaling indicating the number of PDCCH repetitions.

25. An apparatus for wireless communications, comprising:
    a memory;
    at least one processor coupled with the memory and configured to:
        determine a number of repetitions of a physical downlink control channel (PDCCH) transmission, wherein each one of the number of repetitions of the PDCCH transmission has at least one of: a same downlink control information (DCI) payload, a same aggregation level, or a grant for a same data channel allocation;
        monitor the PDCCH based on the determined number of repetitions of the PDCCH transmission, including monitoring different repetitions of the PDCCH transmission of the number of repetitions of the PDCCH transmission in different control resource sets (CORESETs); and
        assume demodulation reference signals (DMRSs) of the different CORESETs share one or more quasi-colocation (QCL) parameters, are transmitted using a same DMRS port, or both.

26. The apparatus of claim 25, wherein the at least one processor is configured to determine the number of repetitions of the PDCCH transmission including receiving signaling indicating the number of repetitions of the PDCCH transmission.

27. A non-transitory computer readable medium storing computer executable code thereon for wireless communications, comprising:

code for determining a number of repetitions of a physical downlink control channel (PDCCH) transmission, wherein each one of the number of repetitions of the PDCCH transmission has at least one of: a same downlink control information (DCI) payload, a same aggregation level, or a grant for a same data channel allocation;

code for monitoring the PDCCH based on the determined number of repetitions of the PDCCH transmission, wherein the code for monitoring includes code for monitoring different PDCCH repetitions of the number of PDCCH repetitions in different control resource sets (CORESETs); and code for assuming demodulation reference signals (DMRSs) of the different CORESETs share one or more quasi-colocation (QCL) parameters, are transmitted using a same DMRS port, or both.

28. The non-transitory computer readable medium of claim 27, wherein the code for determining the number of repetitions of the PDCCH transmission comprises code for receiving signaling indicating the number of repetitions of the PDCCH transmission.

\* \* \* \* \*